United States Patent [19]

Cormier

[11] Patent Number: 5,496,468

[45] Date of Patent: Mar. 5, 1996

[54] WASTE WATER MANAGEMENT SYSTEM WITH AN AUXILIARY RESERVOIR

[76] Inventor: Réginald Cormier, 319 Boul Saint-Pierre Ouest C.P. 1084, Caraquet, Nouveau-Brunswick, F0B 1K0, Canada

[21] Appl. No.: 235,333

[22] Filed: Apr. 29, 1994

[51] Int. Cl.⁶ .................................................. B01D 29/15
[52] U.S. Cl. ........................ 210/172; 210/338; 210/498
[58] Field of Search ..................................... 210/167, 170, 210/153, 257.1, 256, 262, 338, 416.1, 498, 258, 104, 172

[56] References Cited

U.S. PATENT DOCUMENTS

| | | | |
|---|---|---|---|
| 326,500 | 9/1885 | Himrod | 210/498 |
| 2,405,838 | 8/1946 | Lawson et al. | 210/338 |
| 2,442,818 | 6/1948 | Lyman | 210/338 |
| 3,318,449 | 5/1967 | Jennings et al. | 210/104 |
| 3,543,294 | 11/1970 | Boester | 210/170 |
| 4,017,395 | 4/1977 | Davis | 210/167 |
| 4,162,218 | 7/1979 | McCormick | 210/167 |
| 4,228,006 | 10/1980 | Hanna | 210/170 |
| 5,037,548 | 8/1991 | Rosenberg | 210/488 |
| 5,106,496 | 4/1992 | McIntosh | 210/100 |

FOREIGN PATENT DOCUMENTS 806887 12/1936 France .
3932022 11/1990 Germany .

Primary Examiner—Christopher Upton

[57] ABSTRACT

The system consists of a buffer reservoir, which is filled by gravity through a recuperation line which connects domestic appliances producing grey water, like the bathtub, the shower, the washing machine, etc. A multiple concentric elements is integrated in the reservoir and a pump draws the water from the center element of the filter for forwarding to a toilet reservoir, when the latter needs to be filled. The water filter allows the successive retention of finer and finer particles, throws them through a porous top of the filter by using the hydraulic pressure inside the filter to decompose and recirculate debris in and out of the filter while reducing at the same time the accumulation of waste in the reservoir and the frequency of cleanings. The reservoir is also equipped with a line that replenishes fresh water when the amount of grey water in the reservoir is insufficient after filling the toilet reservoir at the time of sollicitation and an overflow line to evacuate the water surplus of the reservoir toward a sewer.

2 Claims, 4 Drawing Sheets

WASTE WATER MANAGEMENT SYSTEM WITH AN AUXILIARY RESERVOIR

BACKGROUND—FIELD OF INVENTION

This invention belongs to the family of devices that help reduce the drinking water consumption, more particularly by rechannelling the grey water coming from different sources like sinks, the bathtub and the washing machine, to the toilet reservoir where it is used again.

BACKGROUND—DESCRIPTION OF THE PRIOR ART

One of the most flagrant displays of drinking water misuse in our society today is undoubtfully the use of toilets. Therefore, a number of systems have been suggested to help filter the grey water and reuse it for this purpose. The prior art shows a variety of systems allowing the collection of grey water, its filtration and its transport to the toilet reservoir. Such a system is illustrated in U.S. Pat. No. 5,106,493, April 1992 where the water is collected in a reservoir; a pump channels the water collected to a reservoir passing first through in filtering device. Another pump carries the filtered water to the toilet reservoir. However, that system needs a complex plumbing arrangement to control the channelling of the grey water toward the reservoir or the sewer, the use of many pumps and the use of a filtering device that is separate from the reservoir.

DE 932022, September 1989 shows another system where the plumbing arrangement is simpler but necessitates the use of two pumps and the use of an electrically-controlled three-way cock to allow the channelling of drinking water to the toilet reservoir when there is a shortage of grey water. An old type of filtering device is shown in U.S. Pat. No. 326,500, September 1885 that shows an assembly of metal cylinders comprising holes located on their upper periphery and another set of metal cylinders with the holes located on their lower periphery. These cylinders are arranged concentrically to alternate the upper and lower holes. A filtering material is installed in the lower part of the device. The filtration is done by gravity as follows: the water enters the filter by the holes located on the upper part of the external cylinder, it then passes through the filtering material to finally exit by the holes located on the lower part of the adjacent internal cylinder. The same process repeats itself until the water reaches the central part of the system from where it is drawn. The filtration method utilized is a material added to the main system which makes the filter maintenance difficult. Another example is U.S. Pat. No. 5,037,548 August 1991, which consists in a number of filtering disks stacked together, whose arrangement allows the retention of particles in a stream of water that becomes more and more restrictive as it comes closer to the center wherefrom the water is drawn. The cleaning of the filter is done by reversing the stream of water through it. This system is however made of a solid body, which makes its maintenance difficult because not easily reachable by the user, who cannot visually control the cleaning process to see if particles are jammed in the system.

OBJECTS AND ADVANTAGES

An objective of the present invention is to provide a pump and filter system that allows the recycling of grey water while it counters the disadvantages mentioned above.

BRIEF DESCRIPTION OF THE DRAWINGS

The present invention will be further understood from the following description with reference to the drawings in which.

DESCRIPTION OF THE PREFERRED EMBODIMENT

Figure 1:
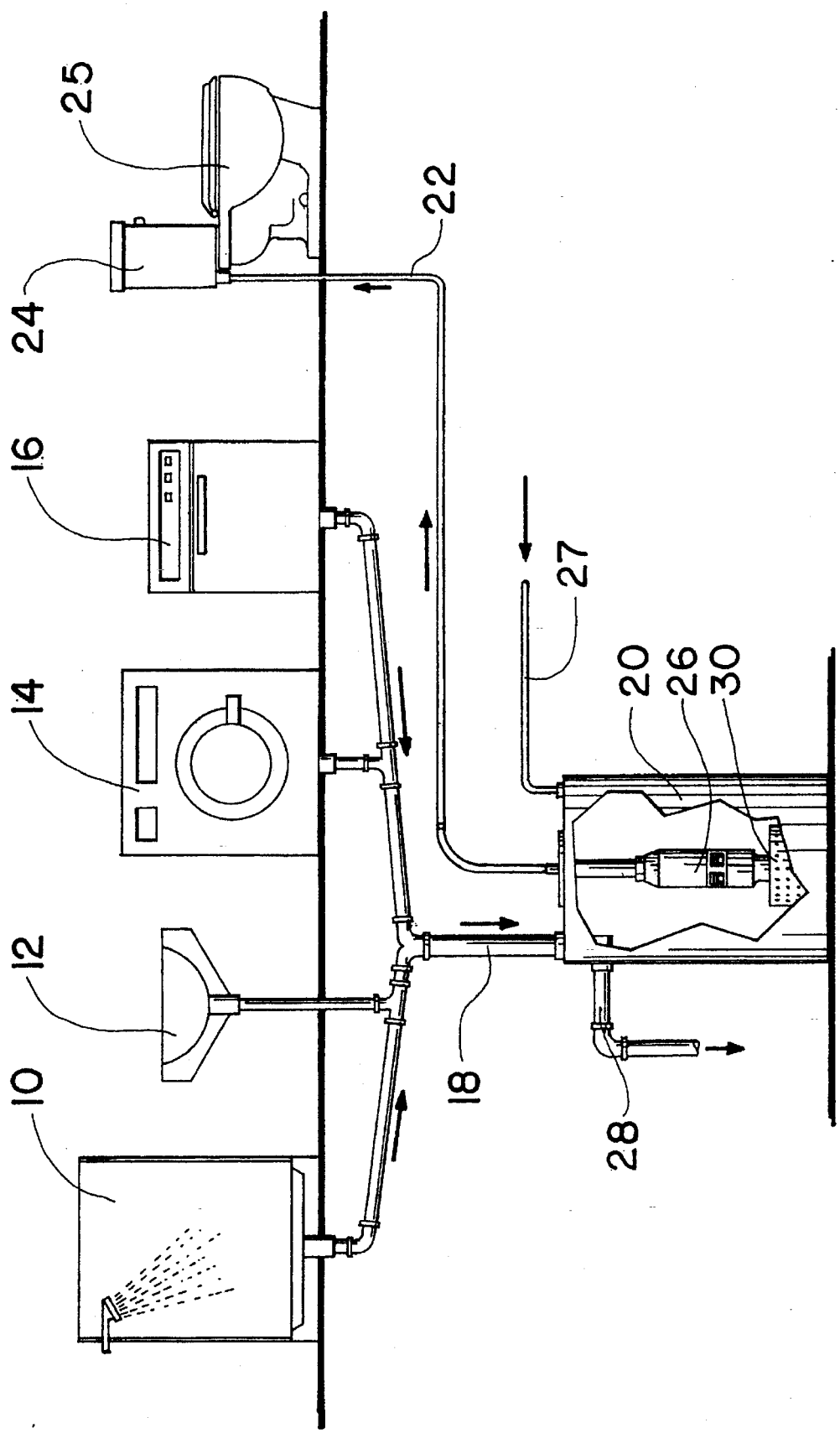
FIG. 1 is an overall view of the grey water recuperation system.

The preferred arrangement of the invention is illustrated in FIG. 1 where one can see grey water coming in part from a shower 10, a lavatory 12, a washing machine 14 and a dishwasher 16. A collecting line 18 is located above a buffer reservoir 20. The latter has a capacity from 100 to 300 liters and is adapted to collect, by way of the collecting line 18, the grey water by gravity. Recuperated water is later forwarded via a recycled water line 22 toward a reservoir 24 of a toilet 25 whenever the latter needs to be filled by a pump 26 of approximately ⅓ hp. The buffer reservoir 20 is also fed by a fresh water line 27 and the overflow may be evacuated through an overflow line 28. The grey water is automatically filtered by means of a self-cleaning filter 30—FIG. 2—located at the bottom of the buffer reservoir 20; this is done to retain the grey water unwanted particles in the buffer reservoir 20. The self-cleaning filter 30 circulates the grey water by means of the pump inlet 31. The latter and the self-cleaning filter 30 are attached to a removable cover 32 on the buffer reservoir 20. The removable cover 32 covers an opening that allows the removal of the pump 26 and the filter 30 for cleaning purposes. A flexible hose 33 links the pump 26 to the recycled water line 22. The pump 26 is submerged and the buffer reservoir 20 water level is controlled by a floater valve 35 which activates the water supply from the fresh water line 27. The floater is located at the center of the buffer reservoir 20 or lower to insure that a good quantity of grey water has been accumulated before fresh water enters the buffer reservoir 20. In case of a surplus of water coming from the collecting line 18 this surplus is evacuated by the overflow valve 36 which empties in the overflow line 28 connected to the sewer system. A detailed view of the self-cleaning filter 30 is illustrated at FIG. 3 where one may see a series of four cylindrical walls 40, 42, 44, 46 and a fixation tube 48 which are spaced concentrically and disposed on a bottom. The flow of grey water through these walls and the fixation tube is done from the outside in by way of peripheral holes 50, 52, 54, 56, 58 disposed concentrically. The diameter of the peripheral holes decreases by half, (8 mm, 4mm, 2 m, 1 mm, 0.5 mm) approaching the center of the filter from where the water is drawn by pump 26, thereby allowing for a filtration in successive steps. A cover 60 comes and closes the assembly of the filter and is fixed with the help of screws 70. Each section of the cover which is delimited by two adjacent walls comprises annular holes 62, 64, 66, 68 disposed concentrically on the annular surface defined by two adjacent cylinders. The ratio of the diameters of annular holes follows the same proportion as the ratio of the diameters of the peripheral holes and each annular hole diameter is slightly smaller than the diameter of the peripheral hole of the next larger diameter. The hydraulic pressure pushes the particles that are caught in between two cylindrical walls, toward the top and into an annular hole and at the same time evacuates such particles from the filter. Moreover, the turbulence created by the entry of the water through the external cylindrical wall where the hydraulic pressure is high and by the exiting through the cover where the pressure is less, tends to break up the particles, reducing their size with each pass through the filter, reducing the accumulation of waste and, also, the frequency of cleaning. The cleaning operation consists in opening the self-cleaning filter 30 by removing its cover 60 and rinsing it out with running water.

Figure 2:
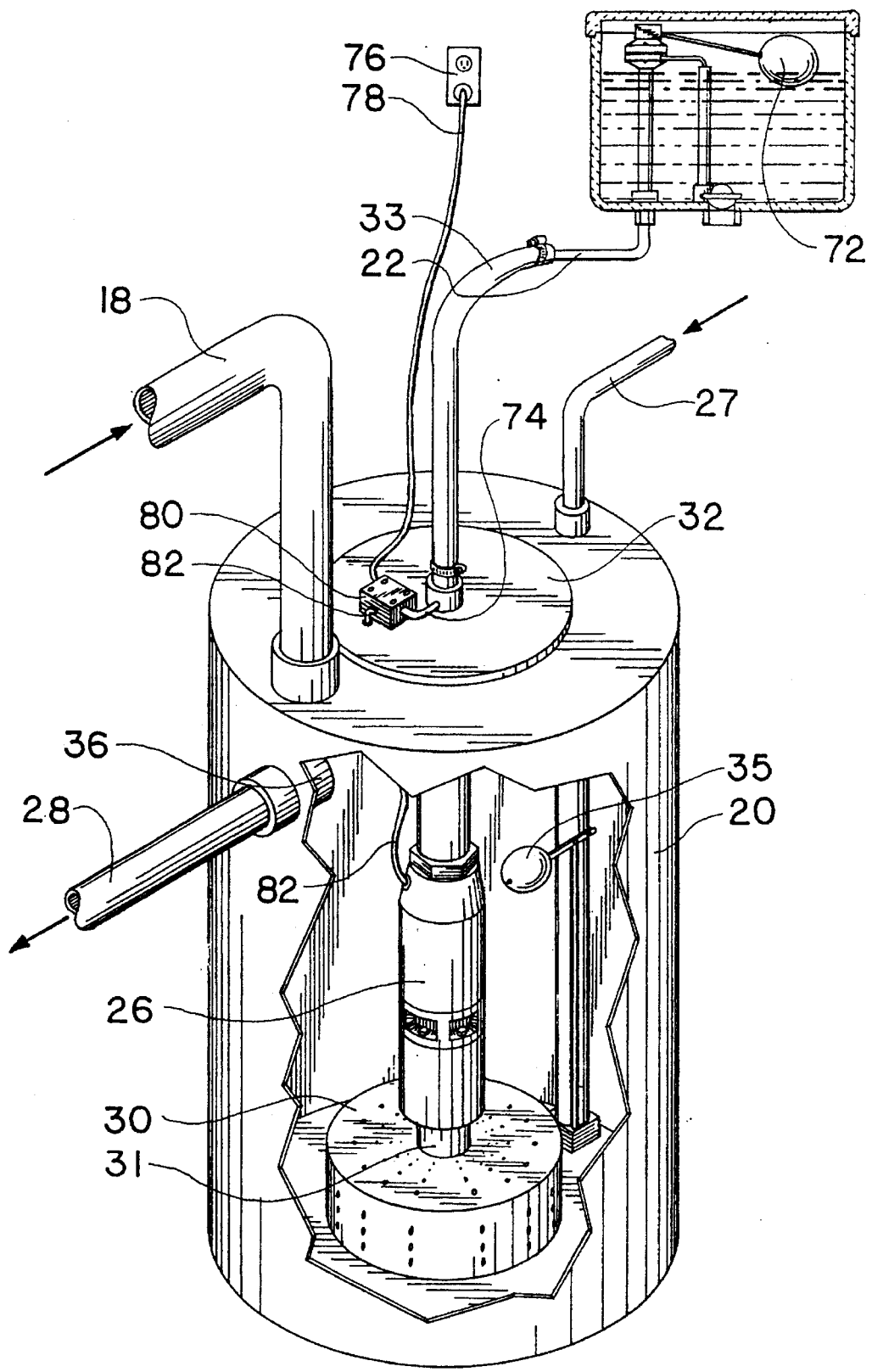
FIG. 2 is a cut perspective view of the buffer reservoir showing its internal components.
Figure 3:
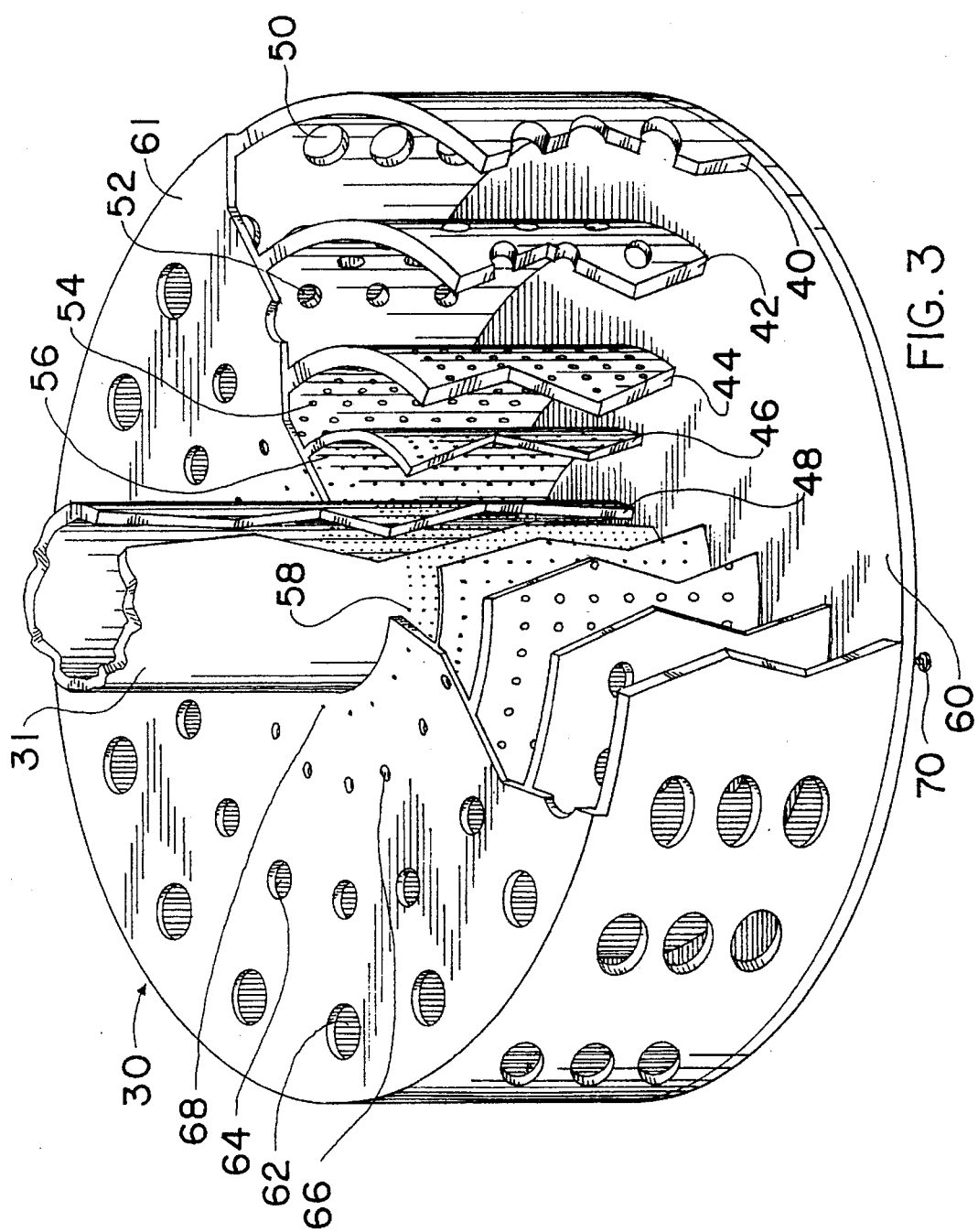
FIG. 3 is a cut perspective view of the filter.

When the pressure drops—FIG. 2—in the toilet reservoir 24 by the water evacuation, until the return of floater 72, a pressure control line 74 acts on a pressure activated control box 80 connected by an electric cable 78, itself connected to power a outlet 76. The pressure activated control box 80 starts the pump 26 by means of a watertight cable 82.

Figure 4:
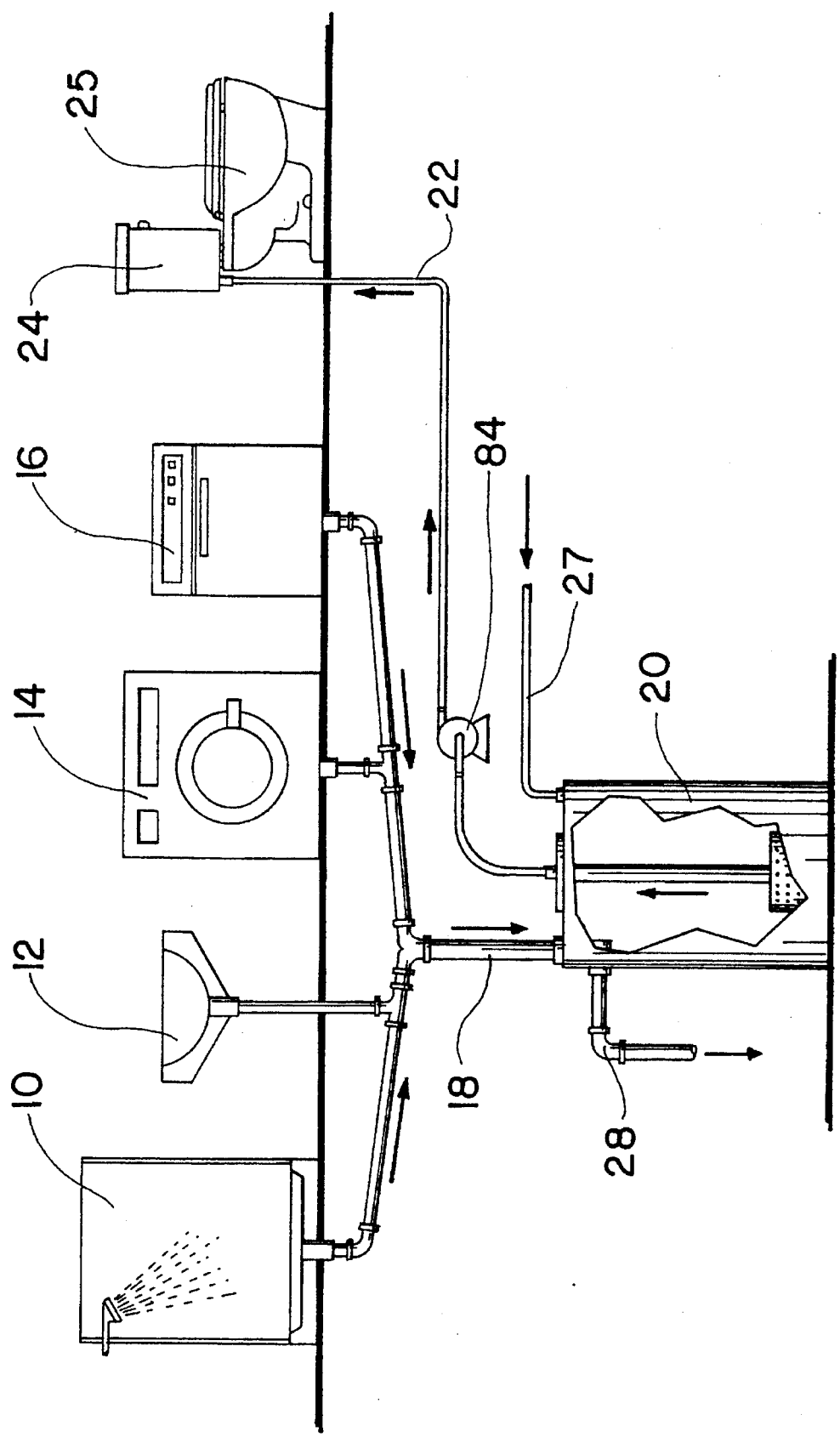
FIG. 4 is an alternative to the system of FIG. 1.

In another embodiment—FIG. 4—the pump 26 could be replaced by an external pump 84 installed on the exterior of the buffer reservoir 20 and still provide enough suction to cause the particles to disintegrate through the filter and to direct the water toward the toilet reservoir 24. The collecting buffer reservoir 20 could be placed at a level other than the one at which the grey water sources are located for certain applications but in those cases the advantages of a system operating by gravity would not be fully exploited. Thus the scope of the invention should be determined by the appended claims and their legal equivalents, rather than by the examples given.

SUMMARY

The system consists of a modular grey water collecting system consisting of a recuperating line connected to a number of domestic appliances that produce grey water and that are located on a first level, a buffer reservoir adapted to receive the grey water, the reservoir having a top and a bottom and being placed on a second level lower than the first level, a filter composed of concentric elements that include a center and a cover part, the filter being located at the bottom of the buffer reservoir, the concentric components having holes whose diameters are smaller as the components are closer to the center, a pump adapted to draw the grey water from the center of the filter and to send it toward a toilet reservoir. The modular grey water collecting system including a drinking water auxiliary feed component toward the buffer reservoir and an overflow component allowing the buffer reservoir to eliminate the surplus of the grey water toward the sewer system. A modular grey water collecting system where the first level is a higher level and the second level is a lower level and where the filling of the buffer reservoir is done by gravity between the higher and lower levels. A modular grey water collecting system where the buffer reservoir is of a height of 1,2 to 1,8 meters.

A modular gray water collecting system where the bottom of the reservoir is filled with water up to a controlled level where the filter is normally submerged. A modular grey water collecting system where the buffer reservoir is equipped with a removable cover located on the upper surface and allowing the movement of the filter from the interior to the exterior of the buffer reservoir. A filter where the ratio of the filtering hole diameters between two cylindrical walls is a factor of two. A filter where the central concentric element serves as a link with the pump. A filter where the filter cover includes annular holes located on an annular ring space defined by the distance between two concentric elements, the diameter of the annular holes being generally smaller than the diameter of the element forming the exterior part of the ring. A filter using the hydraulic pressure to evacuate the particles from the filter out of the holes of the cover of the filter, in order to destroy them and recirculate them through the filter.

The removable lower part may be attached to the concentric elements by screws or by other means such as clips or screwing a bottom plate into the central portion.

| Components list |
|---|
| 10. shower |
| 12. sink |
| 14. washing machine |
| 16. dishwasher |
| 18. recuperation line |
| 20. buffer reservoir |
| 22. recycled water line |
| 24. toilet reservoir |
| 25. toilet |
| 26. pump |
| 27. fresh water line |
| 28. overflow line |
| 30. self-cleaning filter |
| 31. pump 26 inlet |
| 32. reservoir cover |
| 35. floater |
| 36. overflow valve |
| 40. first cylindrical wall, concentric element |
| 42. second cylindrical wall, concentric element |
| 44. third cylindrical wall, concentric element |
| 46. fourth cylindrical wall, concentric element |
| 48. fixation tube |
| 50. first filtering holes |
| 52. second filtering holes |
| 54. third filtering holes |
| 56. fourth filtering holes |
| 58. fifth filtering holes |
| 60. filter cover |
| 62. first annular holes, slightly smaller than first filtering holes 50 |
| 64. second annular holes, slightly smaller than second filtering holes 52 |
| 66. third annular holes, slightly smaller than third filtering holes 54 |
| 68. fourth annular holes, slightly smaller than fourth filtering holes 56 |
| 70. screw |
| 74. pressure control line |
| 76. electrical outlet |
| 78. electrical cable & plug |
| 80. pressure activated control box |
| 82. watertight electrical cable |
| 84. external pump |

I claim:

1. A filter composed of concentric elements that include a centre, an upper cover part, and a removable lower part, said filter comprising a number of concentric elements, said filter located at the bottom of a reservoir, said concentric elements having filtering holes whose diameters are smaller as said elements are closer to said center, said upper cover comprising a number of annular concentric rings each having an external side, an internal side and a width corresponding to the distance between two consecutive concentric elements and each ring provided with annular holes, the diameter of said annular holes being generally smaller than the diameter of the filtering holes of the element corresponding to the external side of said ring.

2. A filter as defined in claim 1 wherein said removable lower part is fixed onto said concentric elements.

\* \* \* \* \*